Patented June 27, 1933

1,915,808

UNITED STATES PATENT OFFICE

DOUGLAS FRANK TWISS AND FREDERICK ARTHUR JONES, OF BIRMINGHAM, ENGLAND, ASSIGNORS TO DUNLOP RUBBER COMPANY LIMITED, A BRITISH CORPORATION

METHOD OF COATING SOLID SURFACES WITH RUBBER MATERIAL

No Drawing. Application filed February 5, 1931, Serial No. 513,770, and in Great Britain March 24, 1930.

This invention relates to an improved method for providing impermeable surfaces of rigid articles such as those of metal, glass, or hard rubber, with tenacious coatings of compositions of rubber or the like.

According to the present invention it has been found that formaldehyde, polymers and derivatives thereof in the presence of a condensing agent such as concentrated sulphuric acid or hydrochloric acid can convert rubber or ketones or mixtures thereof into adhesive compositions suitable for bonding rubber to surfaces such as metal and with or without the addition, subsequent to the reactions aforesaid, of compositions of or containing gutta-percha, balata, rubber or the like.

The present invention comprises treating rubber or ketones or mixtures thereof which can be dissolved in suitable solvents with formaldehyde, polymers or derivatives thereof in the presence of an agent such as concentrated sulphuric acid or hydrochloric acid and with or without the addition, subsequent to the reaction aforesaid, of compositions of or containing gutta-percha, balata, rubber or the like.

The polymers or derivatives of formaldehyde which have been found suitable for the purpose of this invention are methylal, trioxymethylene, paraformaldehyde and hexamethylenetetramine. If rubber or the like is employed the aforesaid polymers or derivatives can if desired be introduced directly into the rubber or the like which has been previously masticated or during the masticating operation.

Formaldehyde and polymers and derivatives are hereinafter generically designated as formaldehyde, and rubber, ketones and mixtures of rubber and ketones are designated generically ketonic cyclic compounds, and the various acids bringing about such condensations are generically termed condensation catalysts, and rubber, gutta percha, balata and other rubber substitutes of artificial or natural origin are generically termed rubber material.

Among agents alternative to sulphuric acid or hydrochloric acid which may be used in furthering the reaction between the rubber or ketones or mixtures thereof and formaldehyde are syrupy phosphoric acid, anhydrous aluminium chloride, acetic anhydride, trichloracetic acid, zinc chloride and anhydrous oxalic acid.

Ketones found suitable in this connection are cyclohexanone or substituted cyclohexanones, camphor, benzophenone, aceto-phenone or acetone. In those cases where rubber or the like is employed the ketones where suitable may also serve as solvents for the rubber.

It has been found in certain instances that the addition of gutta-percha to the adhesive products obtained according to the present invention gives materials which are improved in adhesive properties and in mechanical strength.

Compositions produced as hereinbefore described can be applied in the softened or solid condition in the form of solutions or as aqueous emulsions or dispersions thereof.

Examples of carrying the invention into effect are as follows:—

Example 1

20 grams of methyl cyclohexanone are dissolved in 100 ccs. petroleum naphtha and 25 ccs. of methylal are added. The mixture is cooled in an ice bath while 50 ccs. concentrated sulphuric acid are slowly added. The mixture is shaken and allowed to stand for 24 hours at ordinary temperature, being shaken from time to time. The mixture is poured into cold water and concentrated ammonium hydroxide is added until alkaline. The yellow precipitate obtained is filtered off, well washed with water and dried at 100° C. To the dried product an equal weight of gutta-percha is added and the mixture thus obtained is dissolved in carbon tetrachloride. The solution is now spread on a metal plate, the solvent allowed to dry out and a piece of unvulcanized rubber pressed into contact by rolling with a hand roller. The sheets are clamped together in a screw press and the rubber layer vulcanized by heating in steam. After cooling in the press the vulcanized rubber is found to be firmly attached to the metal plate.

Example 2

10 grams of pale crepe rubber and 10 grams of methyl cyclohexanone are dissolved in 100 ccs. cyclohexane and 50 ccs. concentrated sulphuric acid are added without shaking. To the mixture cooled in ice water 25 ccs. methylal are slowly added without stirring and after standing for about 30 minutes the mixture is cautiously shaken and then allowed to stand for three days at room temperature with occasional shaking. At the end of this time the mixture is poured into excess of cold water and made alkaline with ammonium hydroxide. The solution is filtered and the precipitated mass well washed with cold water and then dried at 100° C. When dry the material is mixed on a roller mill with an equal weight of gutta-percha and the mixture after sheeting out is dissolved in carbon tetrachloride to give a 10% solution, about 2% of aldol alpha naphthylamine being added to the solution.

The solution of the product thus obtained is found to give better adhesion between rubber and metal than that obtained according to Example 1.

Example 3

10 grams smoked sheet rubber are masticated on a roller mill and dissolved in 100 ccs. petroleum naphtha. 10 grams methyl-cyclohexanone are added and then 50 ccs. concentrated hydrochloric acid are added without shaking and the mixture cooled while 25 ccs. methylal are added. The mixture is shaken for 15 minutes and then allowed to stand for 24 hours after which it is poured into water and the acid neutralized with ammonium hydroxide. The product mixed with petroleum naphtha is freed from water as completely as possible and then heated on a water bath until the petroleum naphtha has evaporated and then dried at 100° C.

The dried product is dissolved in carbon tetrachloride to give a 15% solution and an equal volume of a 15% solution of gutta-percha in carbon tetrachloride added. This solution was used as in the previous example for attaching rubber to metal and very good adhesion was obtained when cold. When the metal plate and adhering rubber sheet is heated to 70° C. the rubber may be easily removed from the metal.

Example 4

27 grams of masticated pale crepe rubber are dissolved in 150 ccs. of methylcyclohexanone and when completely dissolved 30 ccs. of concentrated sulphuric acid are added without shaking while the flask is cooled in a freezing mixture. 30 ccs. of well cooled formaldehyde solution 40% strength, are added slowly to the flask which is shaken from time to time. When the whole of the formaldehyde is added the flask is shaken in the freezing mixture until no more heat is evolved. The reaction mixture is allowed to stand for about half an hour at ordinary temperature and is then poured into 300 ccs. of water containing about 100 grams of ice. The mixture is then neutralized with ammonium hydroxide and the water is separated as much as possible from the upper layer of methylcyclohexanone containing the reaction product dissolved there. The upper layer is then well washed with water, separated and dried either by heating on a steam heated hot plate, or if desired, the solvent may be distilled off and recovered. The product obtained is a brown, solid, thermoplastic mass soluble in benzene. To obtain firm adhesion between rubber sheet and metal the solid reaction product is spread on the hot metal plate so that an even layer is obtained and a sheet of unvulcanized rubber is applied and pressed into contact by rolling with a hand roller in known manner. The sheets are clamped together in a screw press and the rubber vulcanized by heating in steam. After cooling in the press it is found that the vulcanized rubber sheet is firmly attached to the metal.

Example 5

10 grams of masticated smoked sheet rubber are dissolved in 100 ccs. of cyclohexanone. When a good solution has been obtained 50 ccs. of concentrated hydrochloric acid are added without shaking and the mixture cooled in a freezing mixture while 40 ccs. of formaldehyde 40% strength are slowly added. Subsequent to the addition of the formaldehyde the mixture is shaken from time to time while still in the freezing mixture. When no more heat is evolved the mixture is slowly heated to about 80° C. and maintained at this temperature for five minutes. The reaction mixture, after cooling to room temperature, is poured into 300 ccs. of water and ammonium hydroxide added until the water layer is distinctly alkaline. The upper layer containing the reaction product dissolved in cyclohexanone is separated from the dilute ammonium hydroxide and then washed well with dilute ammonium hydroxide solution until quite free from acid. After separating the water as completely as possible the solvent is evaporated off on a hot plate. The product is a brown, thermoplastic mass easily soluble in benzene and carbon tetrachloride. To obtain adhesion between rubber and metal a little of this solid is spread on, for example, a hot zinc plate and after cooling the layer is just moistened with benzene so that a tacky layer is obtained. A sheet of unvulcanized rubber is pressed into contact with this tacky layer and clamped thereto in a press. The rubber is then vulcanized in steam at 25 lbs. pressure for 60 minutes. After cooling in the press the rubber is firmly attached to the zinc plate.

Example 6

10 grams smoked sheet rubber are well masticated on a roller mill and dissolved in 100 ccs. methyl-cyclohexanone. To the solution 50 ccs. concentrated hydrochloride acid are added and the mixture cooled in ice. 50 ccs. of 40% formaldehyde are added gradually and the flask shaken from time to time. When no further heat is evolved the mixture is removed from the ice and allowed to stand at room temperature for one hour. At the end of this time the reaction mixture is poured into cold water and neutralized with ammonium hydroxide. The upper layer is separated and well washed with dilute ammonia solution, separated and air dried by spreading on a glass plate. When the solvent has evaporated a hard yellowish brown thermoplastic mass is obtained. This product is rather harder than that obtained in the previous example. A little of the product is spread on a hot zinc plate and while still hot a sheet of uncured rubber is pressed into contact. The whole is heated in steam at 25 lbs. pressure for one hour. On cooling the rubber adheres strongly to the metal.

Example 7

200 grams of masticated rubber is dissolved in 2000 ccs. of petroleum naphtha containing 200 grams of methyl-cyclohexanone in solution. When a homogeneous solution is obtained, 100 grams of paraformaldehyde are mixed into the solution and then 1000 ccs. of concentrated hydrochloric acid are added slowly with constant stirring. The mixture is allowed to stand for about 3 days in the cold, being stirred from time to time.

The solution is washed first with water until almost free from acid then with sodium hydroxide solution and finally with water. The upper layer is separated as completely as possible from the water and the naphtha distilled off.

The reaction product which remains is dried at 100° C. and then rolled on a mill until completely homogeneous, sulphur, zinc oxide, and an organic accelerator of vulcanization are added and the resulting mix dissolved in carbon tetrachloride. An equal weight of gutta-percha dissolved in the same solvent is added. When this solution is used according to the method given in the previous examples very good adhesion of rubber to metal is obtained.

If an aqueous dispersion of the adhesive composition is used this can be applied to the metal surfaces by dipping or by electrophoresis, in which case the layer of rubber to be attached to the metal may be formed by electrophoretic deposition from aqueous dispersions thereof on to the still moist layer of adhesive composition.

Additional materials may be added prior or subsequent to the reaction of the ketones with formaldehyde.

Compounding ingredients may be chosen from vulcanizing agents such as sulphur, accelerators of vulcanization, colouring matters, softeners or preservatives.

The addition of sulphur, zinc oxide and an organic accelerator to the improved products obtained according to the present invention has been found to give products which although not quite so good from the standpoint of adhesion, nevertheless have the advantage of being more resistant to subsequent heating.

Having now particularly described and ascertained the nature of our said invention and in what manner the same is to be performed, we declare that what we claim is:—

1. A method of forming a rubber bonding agent which comprises causing formaldehyde to react with a mixture of rubber and a ketone.

2. A method as claimed in claim 1 wherein a solid polymers of formaldehyde is used.

3. The method claimed in claim 1 wherein an acid condensation agent is used in promoting the reaction between the ketone and formaldehyde.

4. An article having an impermeable surface, a rubber coating on said surface, and a bonding layer between said rubber coating and said impermeable surface, said bonding layer comprising a condensation product of formaldehyde and a ketonic cyclic compound.

5. An article having an impermeable surface, a rubber coating on said surface and a bonding layer between said rubber coating and said impermeable surface, said bonding layer comprising a condensation product of formaldehyde and a ketone.

6. An article having an impermeable surface, a rubber coating on said surface and a bonding layer between said rubber coating and said impermeable surface, said bonding layer comprising a condensation product of formaldehyde and methylcyclohexanone.

7. An article having an impermeable surface, a rubber coating on said surface and a bonding layer between said rubber coating and said impermeable surface, said bonding layer comprising a condensation product of formaldehyde with a mixture of rubber and ketone.

8. An article having a impermeable surface, a rubber coating on said surface and a bonding layer between said rubber coating and said impermeable surface, said bonding layer comprising a condensation product of formaldehyde with a mixture of rubber and methylcyclohexanone.

9. A method of bonding rubber to impermeable surfaces which comprises coating said surfaces with a condensation product of formaldehyde and a ketone, and applying a layer of rubber to said coated surfaces under heat and pressure.

10. A method of bonding rubber to impermeable surfaces which comprises coating said surfaces with a condensation product of formaldehyde and a cyclic ketone, and applying a layer of rubber to said coated surfaces under heat and pressure.

11. A method of bonding rubber to an impermeable surface which comprises coating said surface with a condensation product of formaldehyde and methylcyclohexanone, and applying a layer of rubber to said coated surface under heat and pressure.

12. A method of bonding rubber to an impermeable surface which comprises coating said surface with a condensation product of formaldehyde with a mixture of ketone and rubber, and applying a layer of rubber to said coated surface under heat and pressure.

13. A method of bonding rubber to an impermeable surface which comprises coating said surface with a condensation product of formaldehyde with a mixture of rubber and methylcyclohexanone, and applying a layer of rubber to said coated surface under heat and pressure.

14. The method of forming a rubber compounding agent which comprises causing formaldehyde to react with a mixture of rubber and methylcyclohexanone.

In witness whereof we have hereunto set our hands.

DOUGLAS FRANK TWISS.
FREDERICK ARTHUR JONES.